United States Patent [19]

Gamble

[11] 4,267,473
[45] May 12, 1981

[54] SUPERCONDUCTING GENERATOR THERMAL RADIATION SHIELD HAVING SUBSTANTIALLY UNIFORM TEMPERATURE

[75] Inventor: Bruce B. Gamble, Clifton Park, N.Y.

[73] Assignee: Electric Power Research Institute, Palo Alto, Calif.

[21] Appl. No.: 972,902

[22] Filed: Dec. 26, 1978

Related U.S. Application Data

[63] Continuation of Ser. No. 744,241, Nov. 23, 1976, abandoned.

[51] Int. Cl.³ .............................................. H02K 9/00
[52] U.S. Cl. ........................................ 310/52; 310/261
[58] Field of Search ...................... 310/10, 40, 52, 54, 310/64, 261; 165/89, 105

[56] References Cited

U.S. PATENT DOCUMENTS

| 3,562,489 | 2/1971 | Lenk | 165/89 |
|---|---|---|---|
| 3,648,082 | 3/1972 | MacNab | 310/10 |
| 3,679,920 | 7/1972 | MacNab | 310/52 |
| 3,809,933 | 5/1974 | Sugawara | 310/52 |
| 3,816,780 | 6/1974 | Smith | 310/52 |
| 4,016,444 | 4/1977 | Gillet | 310/52 |
| 4,035,678 | 7/1977 | Lambrecht | 310/52 |
| 4,039,870 | 8/1977 | Sterrett | 310/52 |

Primary Examiner—R. Skudy
Attorney, Agent, or Firm—Flehr, Hohbach, Test

[57] ABSTRACT

A superconducting generator having rotor including a field winding operated at superconducting temperature and a cylindrical electromagnetic shield surrounding and shielding said winding. A cylindrical thermal radiation shield disposed between said electromagnetic shield and said field winding to intercept radiation from said shield and re-radiate to the field winding at a lower temperature with a heat transfer mechanism for rapid cooldown of the thermal radiation shield and serving to maintain the thermal radiation shield at substantially uniform temperature throughout its length.

2 Claims, 4 Drawing Figures

SUPERCONDUCTING GENERATOR THERMAL RADIATION SHIELD HAVING SUBSTANTIALLY UNIFORM TEMPERATURE

This is a continuation of application Ser. No. 744,241 filed Nov. 23, 1976, now abandoned.

BACKGROUND OF THE INVENTION

This invention relates generally to superconducting electrical generators and more particularly to superconducting electrical generators including means for actively cooling the thermal radiation shield disposed between the electromagnetic shield and the field windings of the rotor.

One type of superconducting generator includes a rotating field winding maintained at superconducting temperatures and a stationary winding at the temperature of the surrounds. The rotor winding is contained in a permanently sealed vacuum enclosure including a cylindrical torque tube. A cylindrical electromagnetic shield surrounds the rotor and serves to screen the superconducting winding from transient magnetic fields and non-synchronous components of magnetic fields produced by unbalanced stator currents. The electromagnetic shield is generally at the temperature of the surrounds. In the prior art a thermal radiation shield has been interposed between the electromagnetic shield and the winding region of the rotor to receive the radiation from the electromagnetic shield and re-radiate to the windings at a lower temperature. It is known that the thermal radiation reaching the winding region of the rotor is dependent upon the fourth power of the temperature of the thermal radiation shield. It is therefore important to maintain the shield at uniform low temperature so that radiation to the windings is limited. The thermal radiation shield is generally attached to the torque tube extension on either end of the machine at a location having a temperature between ambient and the winding temperature.

In a large superconducting generator, a substantial heat load is input to the thermal radiation shield both due to thermal radiation and due to electromagnetic fields caused for example, by negative sequence currents in the armature. The thickness of the shield required to conduct this heat to its cold ends can be substantial and can significantly reduce the generator power density and stability. The time required to cool a thermal radiation shield to its operating temperature from ambient temperature can be considerable if the heat must be conducted axially to the ends of the shield.

The thermal radiation shield can be cooled by a helium vapor stream in the same manner that torque tube and and windings are cooled. However, this can introduce significant plumbing and flow control problems.

OBJECTS AND SUMMARY OF THE INVENTION

It is an object of the present invention to provide a means for uniformly cooling the thermal radiation shield to limit the thermal radiation heat input to the field winding region of the rotor.

It is another object of the present invention to provide a device for conducting heat from the central portion of the cylindrical thermal radiation shield to the end portions without introducing significant plumbing or flow control problems while maintaining minimum wall thickness.

It is a further object of the present invention to provide in a superconducting electrical generator a thermal radiation shield having integral with its inner surface a device for automatically and rapidly transferring heat from the center portions of the thermal radiation shield to the cooled end portions.

The foregoing and other objects of the invention are achieved in a superconducting electrical generator of the type including a rotor with field winding and a spaced cylindrical electromagnetic shield with a cylindrical thermal radiation shield disposed between the electromagentic shield and field windings and having its end portions connected to the end portions of the rotor torque tube to be cooled thereby and including means in contact with the inner surface of the shield for pumping heat from the center of the shield to the ends to maintain uniform temperature throughout the length of the cylindrical thermal radiation shield.

DESCRIPTION OF THE PREFERRED EMBODIMENT

Figure 1:
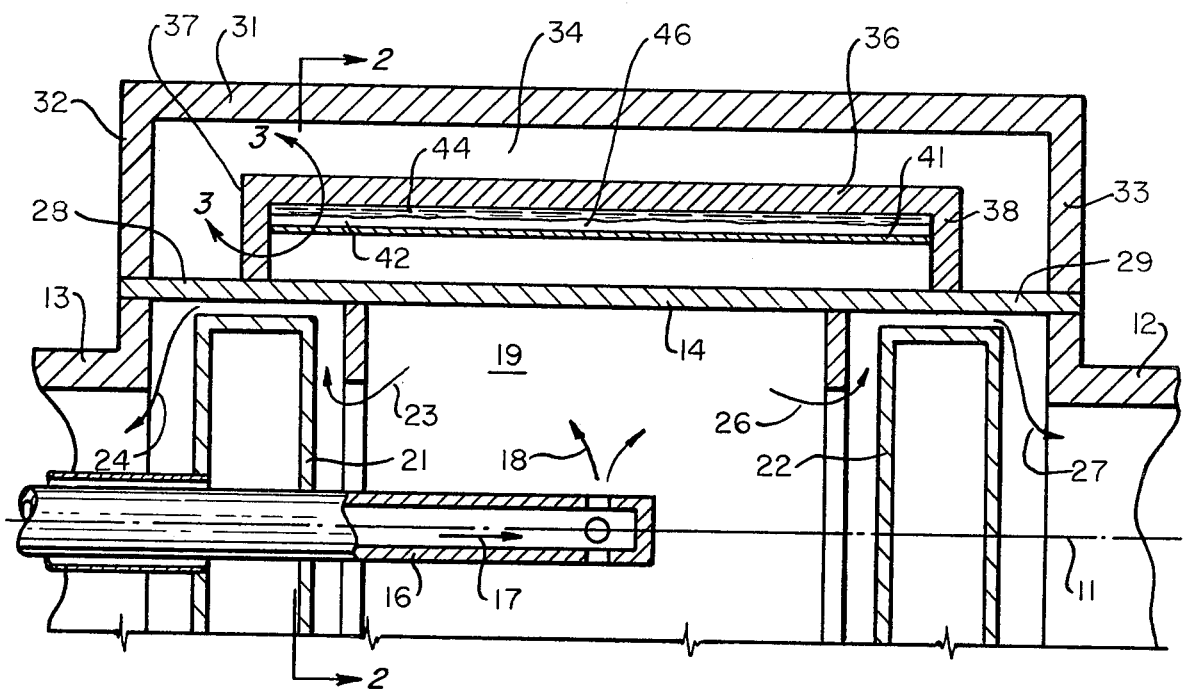
FIG. 1 is a partial sectional elevational view of a rotor for a superconducting electrical generator incorporating the present invention.
Figure 3:
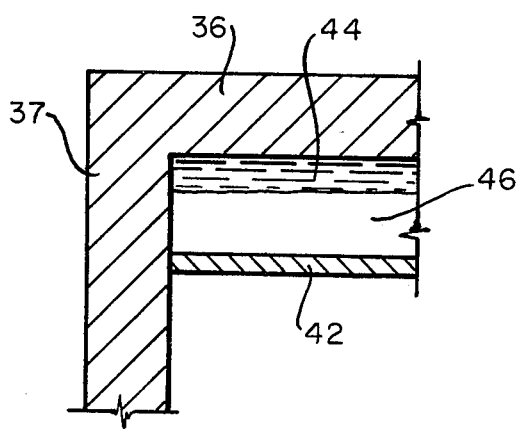
FIG. 3 is an enlarged view of the portion 3—3 of FIG. 1.

Referring to the drawings, there is shown a partial sectional view of a rotor for a superconducting electrical generator of a design known in the art. The center line 11 shows the rotor axis. The rotor includes rotor end shafts 12 and 13 connected to torque tube 14, which extends the length of the rotor. A central tube 16 extends into the hollow rotor and supplies liquid helium to the center of the rotor as shown by the arrow 17 with the helium leaving the probe as shown by the arrows 18 and flowing into the region 19 where the field windings (not shown) are disposed. The liquid helium is forced outwardly against the torque tube 14 by centrifugal acceleration. The helium moves through the windings and maintains them at their superconducting temperature, 4° K. The helium also cools the torque tube to substantially the same temperature. The central tube is fed liquid coolant by a rotating transfer joint (not shown).

Baffles 21 and 22 direct the helium as shown by the arrows 23 and 24, 26 and 27 past the torque tube extension portions 28 and 29. A cylindrical electromagnetic shield 31 is shown with its ends 32 and 33 attached to the end portions of the torque tube adjacent the rotor shafts. The shield serves to shield or screen the superconducting field windings from transient magnetic fields and nonsynchronous components of magnetic field produced by the unbalanced stator currents. The shield also forms together with the torque tube a vacuum enclosure for the field windings. While the torque tube 14 is substantially at 4° K., the electromagnetic shield 31 is substantially at the temperature of the surrounds or higher depending upon the temperature of the stator. Thus, the inner surface of the shield radiates energy towards the torque tube portion 14. There is disposed within the evacuated annular space 34 between the shield 31 and the torque tube 14 a thermal radiation shield 36. The shield is cylindrical having disc shaped end portions 37 and 38 which are attached to the extensions 28 and 29 of the torque tube 14 to be cooled thereby. However, heat must be conducted along the wall 36 to the cooled end portions 37 and 38. This results in a temperature gradient along the thermal radiation shield. For larger generators this gives rise to hot and cold regions along the shield. It is desirable to maintain the thermal radiation shield at a low uniform temperature in view of the fact that the radiation of energy to the torque tube is a function of the fourth power of the thermal radiation shield temperature.

Figure 2:
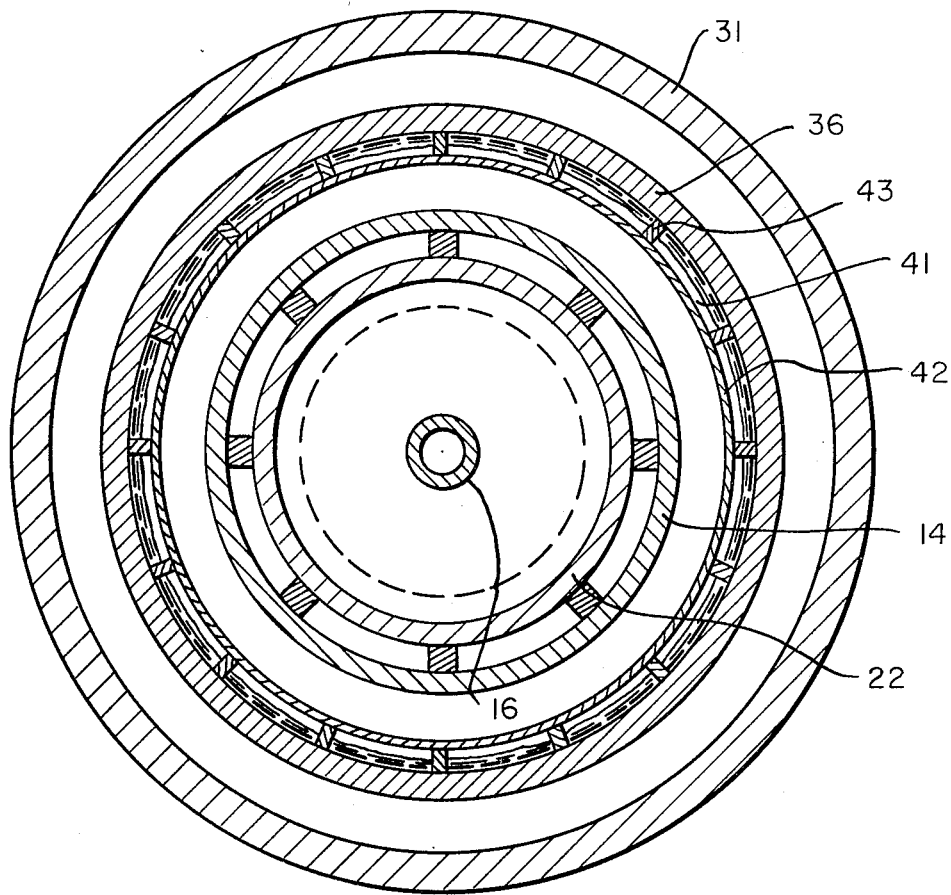
FIG. 2 is a sectional view taken along the line 2—2 of FIG. 1.

In accordance with the present invention there are provided a plurality of passages at the inside surface of the thermal radiation shield. The passages 41, FIGS. 1 and 2, may for example be formed by means of a cylindrical sleeve 42 extending the length of the thermal radiation shield and connected to the end walls 37 and 38. A plurality of spacer bars 43 are secured between the sleeve 42 and the shield 36 to provide support for the sleeve 42. The passages or spaces between cylindrical sleeve 42 and the thermal radiation shield 36 are filled with a coolant such as nitrogen which is sealed within the passages. It is provided as a gas under pressure at room temperature. When the ends of the shield are cooled to operating temperature, a portion of the gas liquifies. During operation, centrifugal forces force the liquid outwardly against the inner wall of the thermal radiation shield. Since the ends of the thermal radiation shield are at low temperature due to contact with the low temperature torque tube extensions, the coolant vapor liquifies near the ends of the thermal radiation shield to provide a layer of liquid 44 adjacent the inner wall and serving to conduct heat therefrom. The thermal radiation shield heat causes the liquid 44 to form vapor 46. Cooling at the end portions 37 and 38 because of the attachment to the torque tube extension causes the vapor to condense. This causes the vapor to flow axially outwardly to replace the condensed vapor from the center towards the two ends 37 and 38 where condensation continues and the liquid 44 is replaced. Thus heat is absorbed from the inner walls of the radiation shield by the conduction and evaporation and transferred along the passages to the ends. This forms a device which maintains the radiation shield at substantially uniform temperature throughout its length.

Figure 4:
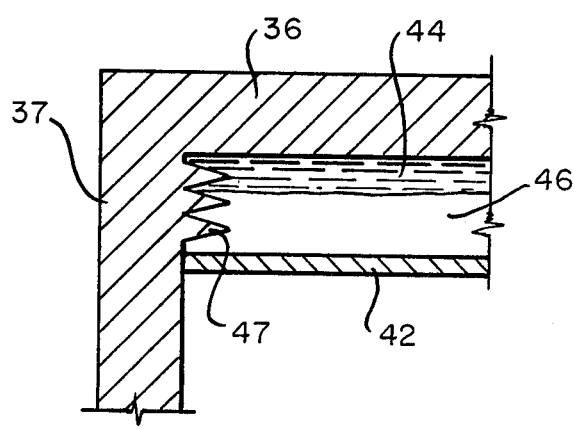
FIG. 4 shows a partial view of another embodiment of the thermal radiation shield.

In some instances it may be desirable to provide an extended surface at the ends to thereby provide increased condensation. Referring particularly to FIG. 4, the end walls are shown with fins 47 which provide an additional surface for condensation of the vapor and replenishing of the evaporated liquid.

In normal operation the passages could be charged with high pressure nitrogen gas while warm and then permanently sealed. Typically when cold the nitrogen would be at one atmosphere of pressure, 100° K. and fifty percent liquid and vapor. This would result in a pressure of less than 15 atmospheres when the generator is not operating and the radiation shield is at surrounds temperature.

It is, of course, apparent that other configuration of passages such as tubes may be provided or that an annular space might be employed.

Thus there has been provided an improved thermal radiation shield assembly for use in superconducting generators.

What is claimed is:

1. A superconducting electrical generator of the type having a rotor including a field winding adapted to operate at superconducting temperatures, a torque tube surrounding said winding and defining a chamber for cooling said winding by the flow of a liquid coolant, said torque tube and said winding being at substantially the same temperature, an electromagnetic shield secured to said rotor and spaced from said windings, said electromagnetic sheild being substantially at the temperature of the surrounds, and a radiation shield disposed between the electromagnetic shield and the windings within said torque tube and having an outer surface serving to intercept thermal radiation from the electromagnetic shield and an inner surface to reradiate a lesser amount of thermal radiation to the torque tube, said radiation shield having its ends connected to the torque tube to be cooled thereby to maintain said radiation shield at a lower temperature than said electromagnetic shield, and heat transfer means in contact with said inner surface including a refrigerant having a liquid and a vapor phase at the operating temperature of the radiation shield serving to transfer heat from the inner surface of said radiation shield to the cooled ends of the radiation shield by evaporation and condensation to thereby maintain the radiation shield at substantially uniform temperature, said heat transfer means including a plurality of passages having as one wall the inner surface of said radiation shield and having their ends in communication with the ends of the radiation shield whereby during operation of the rotor the liquid phase is in contact with the inner surface of the radiation shield to conduct heat therefrom, said heat vaporizing the liquid and the vapor condensing when it contacts the ends of the radiation shield to provide a continuous flow of vapor, and therefore heat, from the center of the radiation shield towards the ends.

2. A superconducting electrical generator as in claim 1 wherein the refrigerant is nitrogen.

* * * * *